Sept. 29, 1931.  F. J. DAY  1,825,385
APPARATUS FOR PRERIPENING OR RETARDING PERISHABLE FOOD PRODUCTS
Filed Dec. 17, 1928
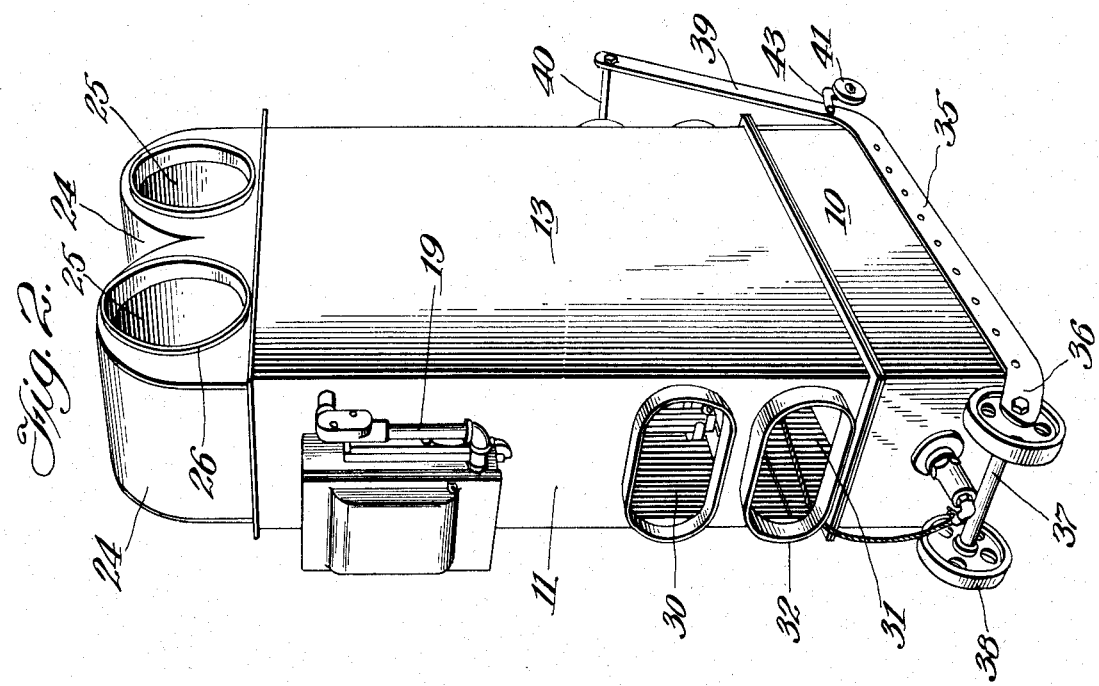
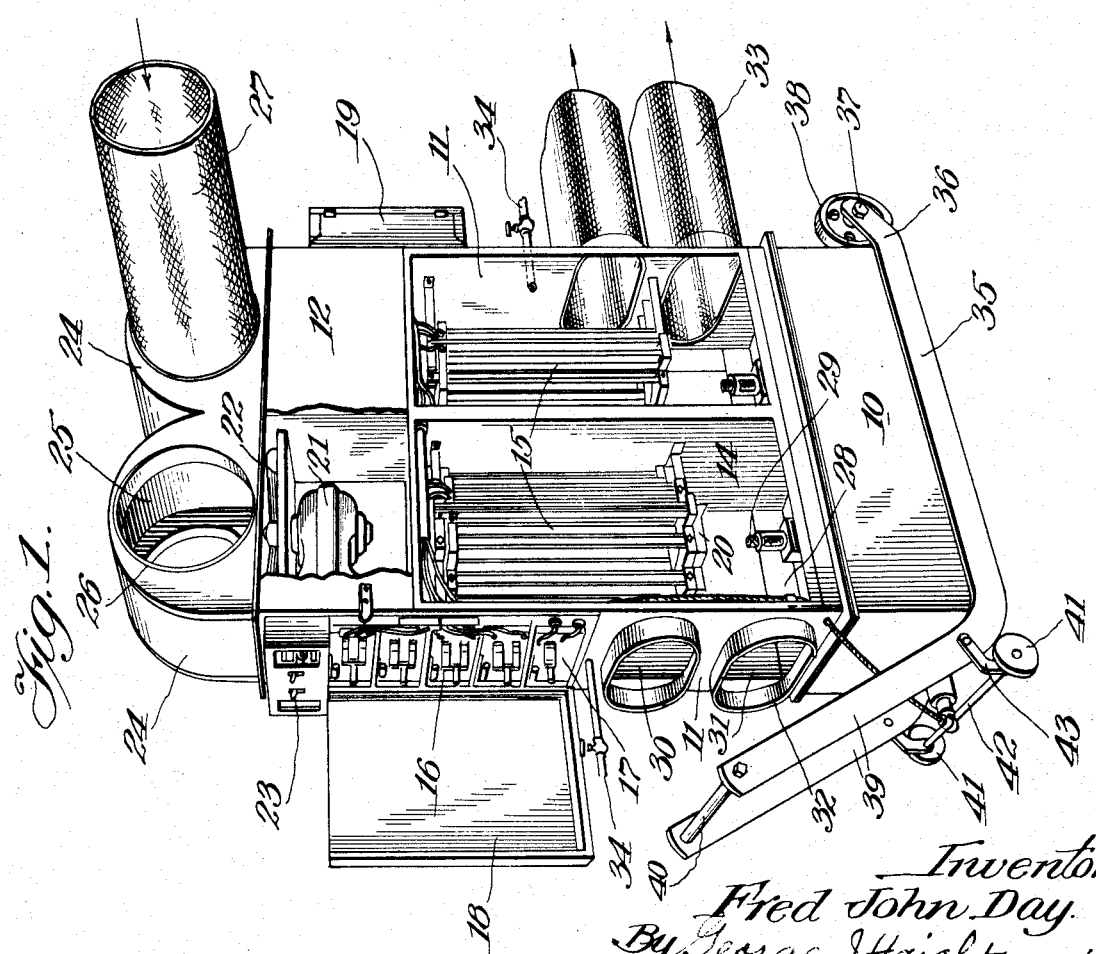
Inventor
Fred John Day
By George J. Haight, Atty.

Patented Sept. 29, 1931

1,825,385

UNITED STATES PATENT OFFICE

FRED JOHN DAY, OF LOS ANGELES, CALIFORNIA

APPARATUS FOR PRERIPENING OR RETARDING PERISHABLE FOOD PRODUCTS

Application filed December 17, 1928. Serial No. 326,581.

It has been found, within recent years, that the dissemination of certain gases, such as ethylene and propylene under proper conditions of temperature and humidity, will accelerate the ripening of food products such as fruits and vegetables, so that the same may be brought to a ripe and marketable condition in a much shorter space of time than would be possible if the fruits and vegetables were allowed to ripen under natural conditions. In order to secure the benefits of this treatment, the fruits or vegetables are stored, either in a storage room or space, or in a refrigerator car, and there treated with the gas or gases required to accelerate ripening. In order to secure the best results of this treatment, it is necessary to maintain an adequate circulation of the gases at proper temperature, and also to maintain proper humidity and regulation of the gaseous content.

The acceleration in ripening appears to be due to an increase in the rate of absorption of oxygen from the atmosphere, with a consequent emission or exhalation of carbon dioxide from the fruits or vegetables, and the circulation appears to be desirable in order to constantly remove from the surface of the produce the products of combustion so as to permit a renewal of the oxygen, and thereby continue the ripening without retardation. It is also possible to retard the ripening of such products by treatment with carbon dioxide or other gases, or to treat the products with fungicides or the like, for the purpose of preventing decay.

The apparatus of the present invention is designed to conform to the above requirements and to provide for proper circulation and dissemination of the gases at proper temperature and under proper conditions of humidity to best subserve the purpose in view. The apparatus is suitably arranged and of a size and shape to permit it to be located within the center of a refrigerator car, being purposely made as narrow as possible, so that it can be placed between the wedge or the bracing of the load in the car, although equally adapted for use in storage rooms or other spaces provided for the storage of fruits and vegetables.

Further details of the invention will appear from a description thereof, in conjunction with the accompanying drawings, wherein,—

Figure 1 is a perspective view of the apparatus of the present invention, showing the front plates removed in part to expose the interior; and Fig. 2 is a similar view, showing the rear side of the machine.

As illustrated, the machine is in duplicate, so that the description of one section or unit will suffice for both. The machine is in the form of an upstanding casing or cabinet, which is preferably about sixty inches high, fifty inches broad, and seventeen and a half inches deep, although obviously the dimensions can be varied, and the above proportions are given simply as an indication of an appropriate size for use in refrigerator cars.

The casing or cabinet comprises a base portion 10, end walls 11—11, front wall panels 12, and a rear wall 13. As shown in Fig. 1, the front wall panels have been in part removed to expose the interior.

The interior is divided by a vertical partition wall 14 into two duplicate chambers, each of which contains a group of electric heating elements 15. These heating elements are separately controlled by means of a group of switches 16 mounted on a switch board 17 on the exterior of the cabinet and concealed by a swinging door 18, which permits access to be had to the switches. The arrangement is one which permits a selected number of the heating elements to be energized in order to secure the desired degree of temperature. This can be done by manual control, or if desired a thermostat device 19 may be provided which will automatically control the switching on and off of the heating elements, in conformity with variations in temperature, in order to maintain a selected temperature within the car or storage space. It is not deemed necessary to show the wiring arrangement for these heating and control elements, since the operation of such devices is well understood in the electrical art.

The heating elements are suitably mounted upon a frame or bracket 20, and above the heating elements is located a motor 21 which operates a fan 22. The operation of the motor is controlled from a switch box 23 located on the exterior of the cabinet. Each of the sections of the cabinet is roofed over by an arch 24 having on each side an enlarged circular opening 25 surrounded by a flange 26 which affords connection for an air inlet pipe 27, preferably in the form of a large flexible canvas duct which may be extended to a desired location within the car or other storage space.

Below each of the heating groups is located a pan 28 for the retention of water, and in order to promote the evaporation of water from the pan a wick 29 is immersed within the water in the pan, being so arranged that by lifting the end of the wick from the water in greater or less degree, the rate of evaporation of the water in the pan may be regulated; that is to say, when a larger portion of the wick surface is exposed above the water, the rate of evaporation will be increased, and vice versa.

The lower portion of each end wall 11 is provided with upper and lower openings 30 and 31, each surrounded by a flange 32, which flanges afford connections for air discharge pipes 33, two only of such pipes being shown in Fig. 1; the pipes 33 are likewise constructed of canvas or the like, and are adapted to be led to the desired locations for the discharge of the air which will be impregnated by a treating gas or the like suitably admitted to the interior of the apparatus through pipes 34 leading to supply tanks not shown.

The base of the cabinet is supported on each side upon a base rail or bar 35, each base rail being upturned to receive the end of a shaft 37, upon which are mounted rollers 38. The opposite ends of the base rails are upturned to afford extensions 39 which are connected by a handle 40.

In order to facilitate transporting of the apparatus, there is provided a pair of front rollers 41 mounted upon the ends of a cross shaft 42 supported by brackets 43 the arrangement being one which permits the rollers to be lifted above the floor when it is desired to locate the apparatus in stationary position, and to be swung down into contact with the floor when the apparatus is lifted by means of the handle 40 to elevate the base rails 35 above the floor level in order to permit the weight to be supported upon the front and rear rollers.

In use, where the device is located in the center of a refrigerator car, or similar storage space, the air inlet pipes 27 connecting respectively with the four air inlet openings, will preferably be led to the four corners of the car or room near the top thereof, and similarly, four air discharge pipes 32 will be led to the four corners of the car or room near the floor level. The motors will then be started, the electric heating elements energized to the desired degree, the pans filled with water, and the wicks adjusted, and a treating gas in the required amount admitted into the apparatus. Thereafter, the operation of the fans will suck in the air from the upper portion of the room and discharge the same near the lower portion thereof, so that a constant circulation of air will be maintained throughout all portions of the room, thereby conditioning the atmosphere of the room as regards temperature, humidity and gaseous content, and maintaining the circulation required in treating the fruits and vegetables, or other perishable products.

Of course, in all cases it may not be necessary to lead the upper and lower pipes to the four corners of the room, and in some cases it may be desirable to omit the upper pipes and allow the air to enter directly into the air inlet ports at the top of the cabinet. In other cases it may be found convenient to locate the device outside of a car or room, and to lead the pipes into the interior of the storage room in such a way as to best promote the required circulation. Where it is desired to transport the apparatus from place to place, this can easily be done by lifting the handle and swinging down the front rollers into contacting relation with the floor, which thus maintains a roller support for the apparatus, enabling it to be readily rolled from place to place.

Although the device has been described primarily as one employed for the conditioning of the atmosphere in the preripening of perishable products, it can be used with advantage in drying out condensation or moisture which has developed in various products, as, for instance, in sacked onions when the same are removed from cold storage, which when removed contain a bulb temperature of 32° F. They are loaded in dry refrigerator cars having false bottoms, which permits the canvas tubes to be so located as to force heated air under the load. This causes a circulation of heated air, which enables the temperature to be raised to about 50° F., and then, by circulating the air, all of the condensation or moisture is absorbed, which returns the onions to a hard, dry, and long-keeping condition. Obviously, the apparatus can be used for other like purposes where portable means are required for maintaining a circulation, and controlling the temperature.

Although the device has been described as a duplicate apparatus, and although such an arrangement may be particularly desirable under some circumstances, it is not the intention to limit the invention to the use of duplicate units, since a single unit may subserve the purpose in some circumstances.

I claim:

1. In a portable self-contained apparatus for treating perishable products in a storage enclosure, the combination of a vertically elongated casing provided at its top and bottom with air ports, electric heating elements located within said casing between the upper and lower air ports, a fan located between said heating elements and one of said ports, flexible ducts connecting with said air ports and extending outwardly therefrom and adapted to be led to the desired point of intake or discharge, thermostatic means for regulating the energizing of the heating elements in conformity with predetermined thermal conditions, and humidifying means located below the heating elements and adjacent to the lower air port.

2. In a portable, self contained apparatus for treating perishable products in a separate storage enclosure, the combination of a vertically elongated casing provided at its top and bottom with air ports, electric heating elements located within the casing between the upper and lower air ports, a fan located between said heating elements and one of said ports, flexible ducts connecting with said air ports and adapted for detachable connection with the storage enclosure containing the products to be treated, thermostatic means for regulating the energizing of the heating elements in conformity with predetermined thermal conditions in said enclosure and a humidifier located below the heating elements and adjacent to the lower air port.

In witness that I claim the foregoing I have hereunto subscribed my name this 28th day of November, 1928.

FRED JOHN DAY.